United States Patent [19]

Fenton et al.

[11] 4,017,594

[45] Apr. 12, 1977

[54] REDUCING THE CONSUMPTION OF ANTHRAQUINONE DISULFONATE IN STRETFORD SOLUTIONS USING THIOCYANATE ION PRECURSORS

[75] Inventors: Donald M. Fenton, Anaheim; Raoul P. Vaell, Los Angeles, both of Calif.

[73] Assignee: Union Oil Company of California, Brea, Calif.

[22] Filed: Aug. 12, 1975

[21] Appl. No.: 604,006

[52] U.S. Cl. .......................... 423/573 R; 423/236; 423/571

[51] Int. Cl.² .......................................... C01B 17/04

[58] Field of Search .................. 423/236, 571, 573

[56] References Cited

UNITED STATES PATENTS 3,904,734   9/1975   Gosden et al. ................... 423/236

*Primary Examiner*—G. O. Peters

*Attorney, Agent, or Firm*—Richard C. Hartman; Dean Sandford; John E. Vanderburgh

[57] ABSTRACT

A process for treating a hydrogen sulfide-containing feed gas, deficient in thiocyanate ion precursors, to convert the hydrogen sulfide to elemental sulfur in which said gas is contacted with an aqueous alkaline washing solution containing a water-soluble metal vanadate, and a water-soluble anthraquinone disulfonate to yield an effluent gas of reduced sulfur content. Thiocyanate ion precursors are added to the solution to reduce the chemical consumption of the anthraquinone disulfonate. The solution is thereafter regenerated by contact with an oxygen-containing gas; elemental sulfur is recovered from the solution; and the regenerated solution is recycled to the gas-contacting step.

11 Claims, 1 Drawing Figure

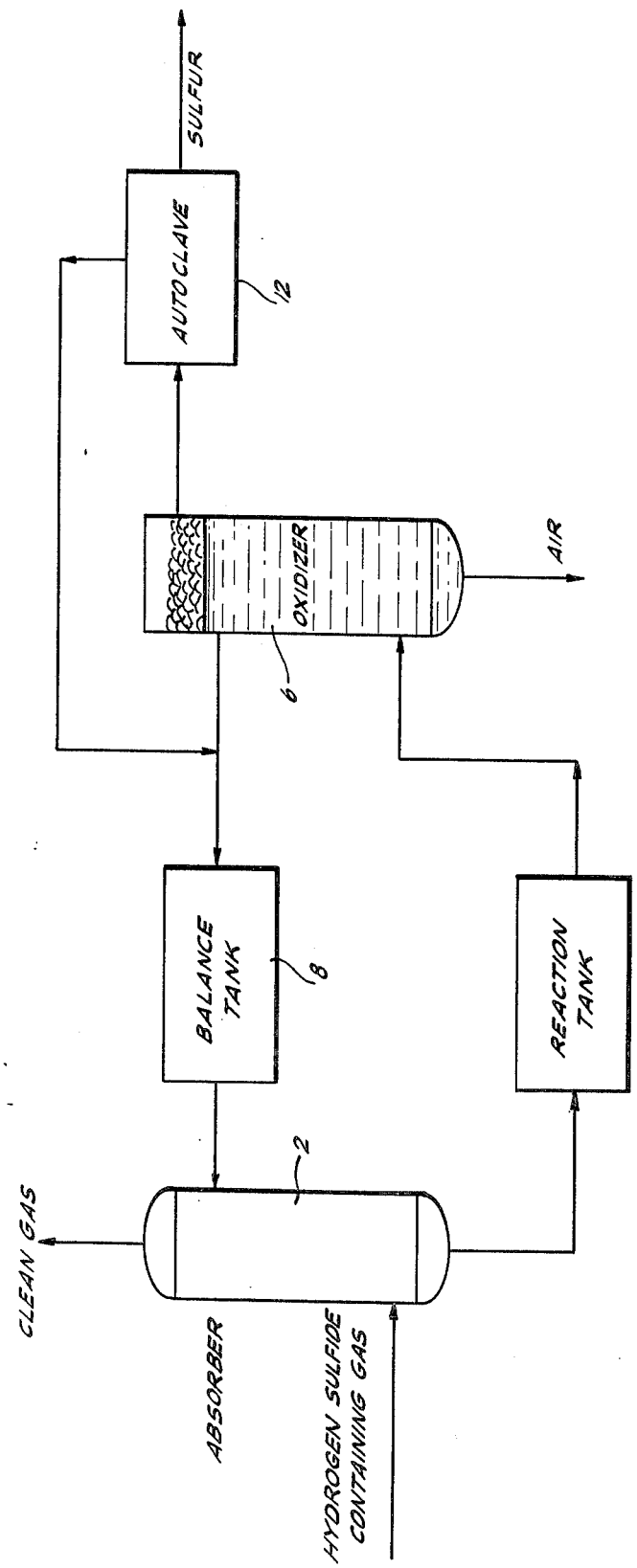

REDUCING THE CONSUMPTION OF ANTHRAQUINONE DISULFONATE IN STRETFORD SOLUTIONS USING THIOCYANATE ION PRECURSORS

BACKGROUND OF THE INVENTION

1. Field of the Invention

This invention relates to the removal of hydrogen sulfide from gases, and more particularly to a process for removing hydrogen sulfide from hydrogenated Claus process tail gas in which the hydrogen sulfide is converted to elemental sulfur.

2. Description of the Prior Art

With the increasing concern over the pollution of the atmosphere, great demands have been made on industry to produce pollution-free products and to do so in a pollution-free manner. One area of particular concern has been the release of sulfur and its compounds into the atmosphere during the refining of petroleum, the sweetening of sour natural gas, the processing of ore, the destructive distillation of coal, and during other processes which produce sulfur-containing gases.

The Claus process, which is widely employed for the desulfurization of hydrogen sulfide-containing gases, is about 90 to 97 percent effective in converting hydrogen sulfide to elemental sulfur. While substantial amounts of sulfur are recovered and, thus, prevented from being released into the atmosphere, in many instances it is necessary to further treat the Claus process tail gas to make it acceptable for discharge into the atmosphere. One process particularly useful for treating these tail gases is the Beavon sulfur removal process described in U.S. Pat. No. 3,752,877, which process involves the hydrogenation of the Claus process tail gas to convert the various sulfur compounds to hydrogen sulfide, and then employing a process, known as the Stretford process, to remove the remaining hydrogen sulfide. The Stretford process is a well-known process for converting hydrogen sulfide to elemental sulfur and is described in U.S. Pat. Nos. 2,997,439, 3,035,889, and 3,097,926.

However, while the Stretford process is satisfactory in many applications, it has been discovered that one of the principal constituents of the washing solution, anthraquinone disulfonate, can be chemically consumed, particularly when the process is used to treat hydrogenated Claus process tail gas. When the anthraquinone disulfonate is chemically consumed, frequent addition of this expensive chemical is necessary to maintain the proper concentration of this constituent in the washing solution.

It was known that during the operation of some Stretford units, such as those used to treat coke-oven gases, sodium thiocyanate is naturally produced in the washing solution as a by-product; while in other Stretford units, such as those which treat hydrogenated Claus process tail gas, sodium thiocyanate is not produced as a by-product of the process. In those Stretford units wherein sodium thiocyanate is naturally produced, the thiocyanate ion concentration of a fresh washing solution is initially zero, and over a period of many months of operation slowly increases to a concentration of 150 grams per liter or more.

It has now been discovered that the presence of thiocyanate ion in the washing solution inhibits the chemical consumption of anthraquinone disulfonate (ADA), and that by increasing the concentration of thiocyanate ion in the washing solution, the rate at which the ADA is consumed can be reduced.

Accordingly, a principal object of this invention is to provide an improvement in the Stretford process for the removal of hydrogen sulfide from gases and its conversion to elemental sulfur.

Another object of this invention is to provide an improvement in the Stretford process when used to treat hydrogenated Claus process tail gas.

Yet another object of this invention is to reduce the amount of ADA consumed in the Stretford process when used to treat a hydrogen sulfide-containing gas.

A still further object of this invention is to reduce the amount of ADA consumed in the Stretford process when used to treat hydrogenated Claus process tail gas.

Further objects and advantages of this invention will be apparent to those skilled in the art from the following description.

SUMMARY OF THE INVENTION

Briefly, the hydrogen sulfide-containing feed gas deficient in thiocyanate ion precursors is treated to convert the hydrogen sulfide to elemental sulfur by contacting the gas with an aqueous alkaline washing solution containing a water-soluble metal vanadate, and a water-soluble anthraquinone disulfonate to yield an effluent gas of reduced sulfur content. According to the present invention, thiocyanate ion precursors are added to the solution, which contains an insufficient amount of thiocyanate ion to prevent the chemical consumption of the ADA, to increase the concentration of thiocyanate ion in the solution. Increasing the concentration of thiocyanate ion in the washing solution reduces the rate at which the anthraquinone disulfonate is chemically consumed. The solution is thereafter regenerated by contact with an oxygen-containing gas; elemental sulfur is recovered from the solution; and the regenerated solution is recycled to the gas-contacting step.

BRIEF DESCRIPTION OF THE DRAWING

The invention will be more readily understood by reference to the accompanying drawing which is a schematic flow diagram of the Stretford process illustrating the manner in which a hydrogen sulfide-containing gas is treated to convert hydrogen sulfide to elemental sulfur.

DETAILED DESCRIPTION

In the Stretford process, a hydrogen sulfide-containing feed gas is treated by contacting the gas with an aqueous alkaline solution to produce an effluent gas of reduced sulfur content and to yield elemental sulfur; the solution is thereafter regenerated by contact with an oxygen-containing gas; the elemental sulfur is recovered from said solution; and the regenerated solution is recycled to the gas-contacting step.

The solution used in this process is an aqueous solution which has been made alkaline to a pH of above 7, and preferably between about 8.5 and 9.5, by the addition of alkalis such as caustic soda, caustic potash, ammonia; or sodium, potassium, or ammonium carbonates or bicarbonates; or organic bases such as alkanolamines. The preferred alkalis are sodium carbonate and bicarbonate, with sodium carbonate being the most preferred. A mixture of sodium carbonate and bicarbonate may also be used, such as a mixture of about 1 to 8 grams per liter of sodium carbonate with about 10 to 30 grams per liter of sodium bicarbonate.

The solution also contains anthraquinone disulfonate (ADA), particularly the disodium salt. All the known isomers of ADA are suitable for use in this process. Also, mixtures of these isomers may be used with advantage, including commercially available mixtures which contain 1,5/1,8, 1,6/1,7, or 2,6/2,7 ADA and possibly small quantities of other isomers. Isomers 2,6 and 2,7 have a higher reactivity with sulfide and are preferred; but since the 2,7 isomer is more soluble in water, it is the most preferred material. The concentration of ADA in the solution, calculated as the disodium salt, can be as high as 6 grams per liter, but more preferably ranges from about 0.3 to 3 grams per liter, and most preferably about 2.5 grams per liter. Throughout this description, the concentration of ADA will be given in terms of the disodium salt.

The solution also contains vanadium in a water-soluble form; such as the metal or ammonium vanadates, including sodium metavanadate, sodium orthovanadate, sodium pyrovanadate, sodium ammonium vanadate or isopolyvanadate, or ammonium vanadate, with sodium metavanadate being preferred. The concentration of vanadium in the solution, calculated as the metal, should be no more than about 10 grams per liter, with the preferred range being 0.3 to 6 grams per liter; the optimum concentration depending upon the volumetric flow rate of the gas and of the solution, and upon the concentration of the hydrogen sulfide in the gas being treated.

The drawing illustrates the operation of the Stretford process, wherein a hydrogen sulfide-containing gas, such as a hydrogenated Claus process tail gas, enters near the bottom of absorber 2. This tail gas typically contains about 1–3 mole percent hydrogen sulfide; about 2–20 mole percent carbon dioxide; traces of methane, water, carbonyl sulfide, carbon disulfide, elemental sulfur, carbon monoxide, methyl mercaptan, and the remainder nitrogen, and is essentially free of thiocyanate ion precursors.

The tail gas flows upwardly through absorber 2, countercurrent to, and in intimate contact with the downflowing solution, which enters near the top of abosrber 2. In most operations, a sodium carbonate solution is used to react with the hydrogen sulfide to form sodium hydrosulfide:

$$H_2S + Na_2CO_3 \rightarrow NaHS + NaHCO_3 \quad (1)$$

The hydrosulfide is oxidized to elemental sulfur by the water-soluble metal vanadate:

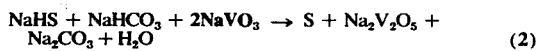
$$NaHS + NaHCO_3 + 2NaVO_3 \rightarrow S + Na_2V_2O_5 + Na_2CO_3 + H_2O \quad (2)$$

The solution then exits absorber 2 at the bottom thereof and enters reaction tank 4 where further and complete chemical conversion to elemental sulfur takes place. The residence time in reaction tank 4 typically varies between 10 and 15 minutes.

The sulfur-containing solution then exits reaction tank 4 and enters near the bottom of oxidizer 6. Air is admitted at the bottom of oxidizer 6 and is churned into small bubbles by a submerged, rotating stirrer-mixer (not shown) located above the air inlet. The solution, which was chemically reduced in absorber 2 and reaction tank 4, is now regenerated to its initial state. The vanadium, which has been reduced to the quadravalent state, is oxidized by oxygen back to its pentavalent state, using ADA as an oxidation catalyst:

$$Na_2V_2O_5 + \tfrac{1}{2}O_2 \xrightarrow{ADA} 2NaVO_3 \quad (3)$$

The solution then flows to balance tank 8 from where it is ready to be recycled. Elemental sulfur appears as a forth at the top of oxidizer 6, from where it is skimmed off, and then flowed to autoclave 12. The autoclave produces molten sulfur as a product and the recovered washing solution is directed back to balance tank 8 for recycling.

It has been discovered that when treating a hydrogen sulfide-containing gas, the ADA in the washing solution can be chemically consumed. The ADA can be consumed at rates which can approach 6 weight percent or more of the ADA inventory per day, particularly when a fresh solution is first circulated. The magnitude of the problem can be fully appreciated when it is realized that a Stretford unit, employing 100,000 gallons of washing solution at an ADA concentration of 2.5 grams per liter, contains about 2,000 pounds of ADA. This means that at a loss rate of 6 weight percent per day, 120 pounds of ADA are consumed each day; and therefore necessitating the addition of 120 pounds of ADA each day.

In view of the above, it is proposed to increase the concentration of thiocyanate ion in the washing solution by adding thiocyanate ion precursors to the washing solution, which will in turn reduce the rate at which the ADA in the washing solution is chemically consumed. In the Stretford units which naturally produce sodium thiocyanate, the addition of thiocyanate ion precursors to the washing solution when the concentration of naturally occuring thiocyanate ion is relatively low will allow one to avoid operation of the Stretford unit under those conditions of highest ADA loss. In the Stretford units which do not naturally produce sodium thiocyanate, the addition of thiocyanate ion precursors to the washing solution will increase the concentration of thiocyanate ion from 0 grams per liter to a concentration which will reduce the rate at which the ADA is chemically consumed. It is generally regarded that an ADA consumption rate of 1 weight percent of the ADA inventory per day is excessive, and that an ADA consumption rate of 3 weight percent or more per day is particularly excessive. It is within the scope of this invention that in those Stretford units wherein the ADA is chemically consumed at more than 3 weight percent of the ADA inventory per day to add sufficient thiocyanate ion precursors to the washing solution to reduce the ADA consumption rate to below 3 weight percent per day, and preferably to below 1 weight percent per day.

The practice of this invention will prove most beneficial in those Stretford units which experience no or very slow build-up of thiocyanate ion in the washing solution. Because the natural build-up of thiocyanate ion in the washing solution is primarily due to the presence of hydrogen cyanide in the feed gas, the addition of thiocyanate ion precursors to the washing solution will provide the greatest benefit to those Stretford units which treat hydrogen sulfide-containing gases which are deficient in thiocyanate ion precursors, namely hydrogen cyanide. In view of the fact that the volumetric feed rate of gas to a Stretford unit can vary greatly, and the quantity of washing solution in the unit can also vary, it is difficult to establish with precision what constitutes a deficient concentration of thiocyanate ion precursor in the feed gas. However, it is considered that 0.2 volume percent of less of thiocyanate ion precursor, measured as hydrogen cyanide, constitutes a deficient amount of thiocyanate ion precursor in the feed gas.

The thiocyanate ion precursors contemplated by this invention may themselves provide the thiocyanate ion or they may react with the various chemicals present in the washing solution, such as the elemental sulfur, to provide the thiocyanate ions. The thiocyanate ion precursors useful in this invention include the alkali metal and ammonium thiocyanates, such as sodium thiocyanate and potassium thiocyanate, with sodium thiocyanate being preferred; and alkali metal and ammonium cyanides, such as sodium and potassium cyanide, with sodium cyanide being preferred. The precursors can be added as single chemicals, or they may be added as mixtures of any of the thiocyanate ion precursors. While hydrogen cyanide is also a thiocyanate ion precursor, its use is not preferred due to its high toxicity.

While the method of this invention is broad to the concept of adding any amount of precursor so as to increase the concentration of thiocyanate ion in a washing solution having any initial concentration of thiocyanate ion, this invention is particularly beneficial in those situations wherein the washing solution has a thiocyanate ion concentration insufficient to prevent the chemical consumption of ADA, such as less than about 5 grams per liter. In these situations it is preferred to add a precursor to increase the concentration of thiocyanate ion, such as from less than about 5 grams per liter to above about 5 grams per liter, and more preferably above about 10 grams per liter. In most cases it will be sufficient if the concentration of thiocyanate ion is increased to between about 5 and 50 grams per liter, more preferably to between about 10 and 50 grams per liter, and most preferably to about 20 grams per liter.

The invention is further illustrated by the following example which is illustrative of various aspects of the invention, and is not intended as limiting the scope of the invention as defined by the appended claims.

EXAMPLE

The Stretford unit selected for testing is producing about 2 long tons of sulfur per day and contains about 100,000 gallons of solution. The unit is being fed hydrogenated tail gas from a Claus unit which is treating a hydrogen sulfide-containing gas. The hydrogenated tail gas contains no measurable amount of thiocyanate ion precursor. The approximate composition of the solution is 2.5 grams of ADA per liter, 2.3 grams of vanadium per liter, 12.5 grams of sodium bicarbonate per liter, 7.5 grams of sodium carbonate per liter and no measurable amount of thiocyanate ion. The pH of the solution is about 8.7. It is estimated that the solution is losing ADA at a rate of more than about 1 weight percent of the solution inventory per day. Sodium thiocyanate is selected as the thiocyanate ion precursor and about 23,400 pounds of sodium thiocyanate is added to the solution. The concentration of thiocyanate ion is increased to about 20 grams per liter. The ADA consumption rate is again measured and found to have decreased to less than about 1 weight percent per day.

Various embodiments and modifications of this invention have been described in the foregoing description, and further modifications will be apparent to those skilled in the art. Such modifications are included within the scope of this invention as defined by the following claims.

Having now described the invention, we claim:

1. In the process for treating a hydrogen sulfide-containing gas to convert the hydrogen sulfide to elemental sulfur in which said gas is contacted with an aqueous alkaline washing solution comprising a water-soluble metal vanadate and a water-soluble anthraquinone disulfonate to yield an effluent gas of reduced sulfur content, the solution is thereafter regenerated by contact with an oxide-containing gas, elemental sulfur is recovered from said solution and said regenerated solution is recycled to said gas-contacting step, and in which said hydrogen sulfide-containing gas is deficient in thiocyanate ion precursors and the concentration of thiocyanate ion in said solution is insufficient to prevent chemical consumption of said anthraquinone disulfonate, the improvement which comprises the step of adding a thiocyanate ion precursor to said washing solution to increase the concentration of thiocyanate ion in said washing solution, said thiocyanate ion precursor being selected from the group consisting of the alkali metal and ammonium thiocyanates and the alkali metal and ammonium cyanides, whereby the concentration of said thiocyanate ion in said washing solution is increased and the consumption of said anthraquinone disulfonate is reduced.

2. The process defined in claim 1 wherein said thiocyanate ion precursor is sodium thiocyanate.

3. The process defined in claim 1 wherein the anthraquinone disulfonate is being consumed at a rate exceeding 3 weight percent of the anthraquinone disulfonate in said solution per day and said thiocyanate ion precursor is added to said solution in an amount sufficient to reduce the consumption of said anthraquinone disulfonate to less than 3 weight percent per day.

4. The process defined in claim 3 wherein said thiocyanate ion precursor is added to said solution in an amount sufficient to reduce the consumption of said anthraquinone disulfonate to less than 1 weight percent per day.

5. The process defined in claim 1 wherein the concentration of thiocyanate ion in said washing solution is less than about 5 grams per liter and said thiocyanate ion precursor is added in an amount sufficient to increase the concentration of thiocyanate ion in said washing solution to above about 5 grams per liter.

6. The process defined in claim 5 wherein the concentration of thiocyanate ion in said washing solution is increased to between about 10 and 50 grams per liter.

7. In the process for treating a hydrogen sulfide-containing hydrogenated Claus process tail gas to convert the hydrogen sulfide to elemental sulfur in which said gas is contacted with an aqueous alkaline washing solution containing a water-soluble metal vanadate and a water-soluble anthraquinone disulfonate to yield an effluent gas of reduced sulfur content, the solution is thereafter regenerated by contact with an oxygen-containing gas, elemental sulfur is recovered from said solution and said regenerated solution is recycled to said gascontacting step, and in which the hydrogenated Claus process tail gas is essentially free of thiocyanate ion precursors, the concentration of thiocyanate ion in said solution is less than about 5 grams per liter and said anthraquinone disulfonate is being chemically consumed, the improvement which comprises the step of adding a thiocyanate ion precursor to said washing solution, said thiocyanate ion precursor being selected from the group consisting of the alkali metal and ammonium thiocyanates and the alkali metal and ammonium cyanides, said thiocyanate precursor being added in an amount sufficient to increase the concentration of thiocyanate ion in said washing solution to above about 5 grams per liter.

8. The process defined in claim 7 wherein the concentration of thiocyanate ion in said washing solution is increased to between about 10 and 50 grams per liter.

9. The process defined in claim 7 wherein said thiocyanate ion precursor is sodium thiocyanate.

10. The process defined in claim 7 wherein the anthraquinone disulfonate is being consumed at a rate exceeding 3 weight percent of the anthraquinone disulfonate in said solution per day and said thiocyanate ion precursor is added to said solution in an amount sufficient to reduce the consumption of said anthraquinone disulfonate to less than 3 weight percent per day.

11. The process defined in claim 10 wherein said thiocyanate ion precursor is added to said solution in an amount sufficient to reduce the consumption of said anthraquinone disulfonate to less than 1 weight percent per day.

* * * * *